Patented Mar. 8, 1932

1,848,292

UNITED STATES PATENT OFFICE

GUY C. HOWARD, OF WAUSAU, WISCONSIN

LIGNIN DERIVATIVES AND PROCESS OF MAKING SAME

No Drawing.    Application filed October 15, 1930.  Serial No. 488,995.

This invention relates to the making of a purified lignin product from the waste sulphite liquors which result from the digestion of wood by the sulphite process to form paper pulp.

It has been proposed to treat waste sulphite liquors with a large excess of caustic lime and subject the resulting mixture to a steam pressure cook in a suitable container, whereby part of the organic matter in such liquors is precipitated along with a considerable amount of calcium sulphite and the balance of the organic matter remains in solution. The precipitated organic matter was regarded as various lime lignins and other basic lime organic compounds. The organic matter remaining in solution was considered to be organic compounds and acids described as of the lactonic acid type. On separating the precipitated matter it was found that its organic matter content was practically insoluble in hydrochloric and other acids, thus allowing the decomposition and removal of its calcium sulphite content by an acid treatment.

The commercial treatment of waste sulphite liquor in this manner involves some difficulties and is handicapped in various ways. The liquors are relatively dilute and large gallonages must be handled through the pressure cooking treatment thus necessitating expensive equipment and high steam cost. Such process does not lend itself readily to a continuous process operation and a batch type of operation is involved. The whole liquor is treated—which means the pressure cook is carried out in the presence of the carbohydrate constituents and the entire sulphur content of such liquor, and these carbohydrates are known to break down more or less under such a treatment with the development of acidic derivatives which combine with lime and thus increase the reagent requirements of the process. The precipitated product is thus the resultant of a caustic lime pressure cook of the whole waste sulphite liquor without prior separation of the lignin from the carbohydrate substances in such liquors and in the presence of their entire sulphur content.

In my process for treating waste sulphite liquors, United States Patent No. 1,699,845 (reissue application Serial No. 435,009, filed March 11, 1930) such liquors are segregated into three primary products namely, (1) a solid inorganic product consisting largely of calcium sulphite, (2) a wet solid organic product containing practically all the lignin component of such liquors and substantially free from its carbohydrate substances and (3) a liquid effluent product which carries the carbohydrate substances and a substantial amount of the sulphur content of the original liquor.

I have discovered that a product having highly desirable properties for commercial use may be obtained by subjecting the wet solid lignin product normally recovered by the above process to a steam pressure cook without the further addition thereto of any lime or other alkaline reagent altho further amounts of such reagents may be added if desired. The wet solid organic material as recovered by the above process constitutes a concentrated and purified lignin substance which can be charged direct into suitable pressure digesters in which to give it the desired steam pressure cook. It is alkaline and normally contains enough available lime to maintain the desired caustic lime alkalinity during the cooking treatment without the necessity of supplying more lime reagent. When given a pressure cook under certain conditions (to be described later) it yields practically all its organic matter content in a solid form which is insoluble in hydrochloric acid and has other desirable properties whereas prior to such cook this organic matter readily dissolves in aqueous acid solutions. The organic component of such solid product represents a resultant substance from subjecting a purified and concentrated lignin material to a steam pressure cook under conditions of caustic lime alkalinity and in the substantial absence of carbohydrate substances and normally in the presence of a diminished amount of sulphur relative to the original waste sulphite liquor, since a substantial amount of the sulphur in the waste sulphite liquor is preferably removed as calcium sulphite prior to the recovery of the solid lignin product which is given this steam pressure cook. The necessity of handling large gallonages through a pressure cooking treatment with its resulting higher steam costs and more expensive equipment is avoided. Furthermore such lignin product as it comes from the cooking treatment will normally contain materially less admixed calcium sulphite than the product made by cooking the whole waste sulphite liquor as heretofore proposed by reason of the above described removal of calcium sulphite.

It should be noted that by this procedure I entirely eliminate all possibility of the production or formation of compounds resulting from combination between the lignin and the carbohydrate substances or their respective derivatives during the pressure cooking treatment and secure a solid lignin product as it comes from the digester with materially less admixed calcium sulphite component which thus constitutes a material of lower ash content and one which can be more readily converted to a practically ash free condition. Furthermore the removal of such foreign components prior to the pressure cook allows subjecting the lignin substance if desired to more strenuous cooking conditions as regards both higher temperatures (pressures) and longer duration without the danger of secondary reactions resulting from the presence of such impurities.

The organic product recovered by my patented process (above referred to) of treating ordinary waste sulphite liquor with caustic lime is a solid lignin-containing material substantially free from carbohydrate substances and contains both sulphur and calcium compounds. Normally it contains sulphur (exclusive of any sulphates) in a ratio of 32 parts of sulphur to approximately 500 parts of lignin substance and contains in excess of 56 parts of CaO to 32 parts of sulphur and to 500 parts of lignin substance. (The expression "500 parts of lignin substance" as used in this application is intended to mean a unit combining weight of lignin substance relative to its organically combined sulphur content and is based on tests which indicate such unit combining weight to be normally around 500 parts by weight of lignin substance to 32 parts of sulphur.) This material is believed to be largely a lignin substance with which both sulphur and lime are combined in the ratio of 32 parts of sulphur to 56 or more parts of CaO to around 500 parts of lignin substance but that such material as normally made contains minor amounts of inorganic calcium sulphite and possibly some organic components which are either sulphur free or of relatively lower organically combined sulphur content. There is always materially more CaO present than required for a $CaSO_3$ ratio of 56 parts of CaO to 32 parts of sulphur and the amount of this excess is somewhat variable. Some of this is undoubtedly present as free caustic lime but a majority of such excess is believed to be present in the form of the calcium salts of weak organic acid groups.

The organically combined sulphur is believed to be present as a sulphonic acid group (i. e. $.SO_3H$) attached to the lignin substance and part of the CaO to exist as the salt of such acid group. The material is alkaline and normally has a pH value materially above 10.5. If its pH value is lowered by addition of an acid having a strength equal to or greater than carbonic acid it will dissolve to an aqueous solution containing organically combined sulphur in a proportion approximating 32 parts of sulphur to 500 parts of the lignin substance but the amount of CaO present as salts of organic acids will vary with the pH value.

When such wet lignin substance which is strongly alkaline with lime is given a steam pressure cook organically combined sulphur evidently splits off to yield calcium sulphite and concurrently with this more or less alteration or rearrangement of the residual organic complex takes place. The extent of these effects is a function of both the duration and the temperature (pressure) of the cooking treatment and presumably represents the resultant condition for the specific time and temperature but the temperature (pressure) is evidently the more dominant factor in determining the amount of organically combined sulphur split off.

Careful analyses of the products resulting from such cooking treatment under varying conditions of temperature and time show conclusively that the amount of inorganic calcium sulphite increases and the amount of organically combined sulphur decreases with increasing temperature and duration of cook. Thus as compared with the normal base ratio for the untreated lignin substance of 32 parts of sulphur organically combined with around 500 parts of lignin substance the corresponding ratios in the products show progressive changes consistent with a formation of calcium sulphite and a decrease in the organically combined sulphur. For example the product from a pressure cook of one (1) hour at 40 lbs. gauge pressure gives a ratio of 32 parts of organically combined sulphur to 705 parts of lignin substance, a two (2) hour cook at 40 lbs. shows a ratio of 32:900 and on prolonging the time to eight (8) hours at 40 lbs. the ratio becomes 32:980.

The product from a one (1) hour cook at 75 lbs. pressure shows a ratio of 32:935, a two (2) hour cook at 75 lbs. gives a ratio 32:1018 and an eight (8) hour cook at 75 lbs. has a ratio of 32:1175.

A ratio of 32:1000 represents a reduction of 50% in the organically combined sulphur relative to the normal base ratio of 32:500 for the uncooked material and my various tests indicate that materially more than such 50% of organically combined sulphur can be removed from the lignin substance through conversion to calcium sulphite by a pressure cook under conditions of lime alkalinity.

It is evident that with increasingly high temperatures (i. e. pressure) a progressive reduction in the organically combined sulphur in the product will result but prior to its complete removal in this manner as calcium sulphite the requisite temperature may reach a point at which secondary reactions set in to change the course of the reactions.

Incidentally tests (which are not relevant to this invention) indicate that in the removal of organically combined sulphur from similar lignin substance under acid conditions there is a critical point reached at about the 32:1000 ratio below which the organically combined sulphur can be removed rather easily as sulphur dioxide while beyond such point removal of sulphur appears to involve different chemical reactions.

It is difficult to follow quantitatively the alterations or rearrangements which take place in the residual lignin complex during the presure cooking treatment but that appreciable changes do take place is indicated by variations in iodine consumption of the products (exclusive of the influence of the calcium sulphite) as compared with the uncooked material. Also such alterations or rearrangements are indicated by the relative facility with which the products, made under various conditions of time and temperature, tend to recombine and dissolve in sodium bisulphite and other reagents.

The solubility of the product is likewise a function of the time and temperature of the cooking treatment and is specific for different water soluble reagents. For example, the product from either a one (1) or a two (2) hour cook at 25 lbs. pressure is soluble in carbonic acid solution but is insoluble in hydrochloric acid of normal strength, whereas the product from a four hour cook at 25 lbs. is insoluble in both carbonic acid solution and hydrochloric acid. On the other hand the product from a one hour cook at 75 lbs. pressure is practically insoluble in carbonic acid solution and insoluble in HCl.

The product from a one (1) hour cook at 40 lbs. is soluble in sulphurous acid solutions at atmospheric pressure, relatively soluble in warm sodium bisulphite solution of 5% strength, and soluble in carbonic acid solution, but is only slightly soluble in hydrochloric acid, while the product from a four (4) hour cook at 40 lbs. is insoluble in all these solvents. It should be noted however, that the degree of insolubility which characterizes these products refers to treatment under atmospheric pressure and temperatures below 100° C. as distinguished from pressure cooking treatments.

The variations in solubility for a specific solvent e. g. carbonic acid, evidently reflect (1) the extent of the reduction in organically combined sulphur, (2) the alteration or rearrangement in the residual lignin complex and (3) the solubilizing influence of the residual attached .$SO_3H$ group when present as its calcium salt.

The divergence in solubility between two acids e. g. carbonic and hydrochloric, apparently reflects the difference in solubilizing influence of an .$SO_3H$ group and the calcium salt of such group.

The solubility characteristics of the product in sulphurous acid and bisulphite solutions is evidently a resultant of the acid character of such solvents together with a specific tendency of sulphurous acid and bisulphite to recombine with the organic matter to solubilize it and the facility of such recombination is more or less dependent on the reduction of organically combined sulphur and the influence of any alteration or rearrangement in the residual lignin complex.

In commercial operation the duration and pressure of the cooking treatment will be determined by the desired properties and uses of the final product and can be readily varied to suit the use requirement. For example, where the product can be advantageously used for certain purposes without separating the associated inorganic components from the residual lignin substance a low pressure and short time cook will serve the requirements. On the other hand where it is desired to treat the cooked product to remove its calcium sulphite and other inorganic constituents the pressure and time of cooking will be controlled to yield a product in which the residual lignin substance is insoluble in the acid reagent to be used in the removal of such inorganic compounds, for example, sulphurous acid ($H_2SO_3$) which will remove substantially all the inorganic compounds present save its small component of calcium sulphate (gypsum). Furthermore where a final product with a minimum content in organically combined sulphur is desired the cooking pressure will be increased and the time prolonged to the maximum practical without inducing undesirable secondary reactions.

In general a satisfactory product for many purposes can be gotten by cooking for one (1) hour at 75 lbs. pressure (or for longer time at a somewhat lower pressure) while for other purposes it may be desired to cook at much higher pressures (temperatures) and for still other purposes it may be desired to cook at minimum pressures and time to secure a product with more solubility and less alteration or rearrangement of the lignin complex.

The steps involved in the process of this invention may be described as follows:

(1) Subjecting waste sulphite liquor or equivalent suitable liquors to a proper treatment at atmospheric pressure and at a temperature below 212° F. with solid phase caustic lime reagent whereby (a) a substantial portion of the sulphur content of such liquor is precipitated as an inorganic product consisting largely of calcium sulphite and which may or may not be separated from the mother liquor as desired, (b) a solid lignin containing product in alkaline form is recovered which is substantially free from carbohydrate substances and which contains only such amounts of sulphur compounds as represents the total sulphur in the original waste sulphite liquor less that which may have been previously removed by separation of the aforesaid calcium sulphite product and less that substantial amount of sulphur compounds which remains in the hereinafter described effluent product and (c) a liquid effluent product which contains substantially all the carbohydrate substances of such original liquor together with a substantial proportion of the sulphur content of the original liquor.

(2) Subjecting said wet solid lignin product, if desired, to a washing treatment with water which is made alkaline with caustic lime to displace its mother liquor content and thus further purify it through removal of the carbohydrate substances carried by said residual mother liquor.

(3) Subjecting the aforesaid purified lignin product (from (b) or (2) above) in its concentrated wet solid form and either with or without the addition of more caustic lime reagent, as may be desired, to a steam pressure cook at controlled pressures above atmospheric pressure and for controlled duration whereby the lignin substance is converted to a product having a substantially reduced content in organically combined sulphur, said product being admixed with calcium sulphite which is a product of the reaction and with greater or less quantities of other inorganic compounds, and which may, as desired, be either soluble or insoluble in aqueous acid solutions.

(4) Separating said solid products from their associated mother liquor by any suitable means and either rejecting or otherwise utilizing said mother liquor.

(5) Using said separated solids in such wet condition, if desired, or drying said solids to a product which is alkaline and contains inorganic compounds admixed with the lignin material.

(6) Separating said separated solids, if desired, by an acid treatment e. g. with cold sulphurous acid ($H_2SO_3$) or hydrochloric acid (HCl) whereby the admixed calcium sulphite and other inorganic compounds are substantially removed to yield a lignin product of reduced content in organically combined sulphur and of low ash content and with other desirable properties for its utility in either wet or dried form.

(7) Utilizing the inorganic substances removed from said lignin product.

The lignin product as ordinarily produced when substantially freed from inorganic compounds is a light brown material which readily pulverizes to an unusually fine powder of more pronounced brown color. It is insoluble in strong acids such as HCl and $H_2SO_4$ and in cold sulphurous acid and in the usual organic solvents, but can be dissolved in caustic soda and some other reagents under suitable conditions. Its specific gravity is low and it is practically ash free. Presumably it has some acidic properties due to any residual sulphonic acid groups ($SO_3H$) or phenolic groups (OH) still present.

The uses for such lignin products result from its various properties such as insolubility and relative stability in strong acids, low ash content, low specific gravity, color, organic composition, high dielectric constant when dry, plasticity, physical properties and so forth. For example, some of the uses which suggest themselves are as constituent in various paper products, linoleum, rubber goods, explosives, glues, molded products and so forth—especially where resistance to acids is desired, as a pigment in paints and lacquers—especially since it should lend itself as a dye carrier, as a purified lignin intermediate raw material, as a material with which to form solid or semi-solid electrolytes as in storage batteries.

Some of the advantages of the invention over prior processes reside in the economic aspects of the process of making, the purity of the resulting lignin product, and in the increased practical range of pressure and other treatment to which lignin substance in concentrated form can be subjected when freed from associated carbohydrate substances.

I claim:

1. The process of producing a lignin derivative which comprises treating waste sulphite liquor with solid phase caustic lime to produce precipitated organic material containing approximately 32 parts of organically combined sulphur to 500 parts of organic matter and substantially free from carbohydrate substances, and separating said precipitated material from the liquor and subjecting it to a steam pressure cook under conditions of caustic lime alkalinity sufficient to cause a diminution in its organically combined sulphur content through formation of calcium sulphite and to yield solid organic material of diminished solubility in aqueous acid solutions.

2. The process of producing a lignin derivative which comprises treating waste sulphite liquor with solid phase caustic lime to produce precipitated organic material containing approximately 32 parts of organically combined sulphur to 500 parts of organic matter and substantially free from carbohydrate substances, and separating said precipitated material from the liquor and subjecting it to a steam pressure cook under conditions of caustic lime alkalinity sufficient to cause a diminution in its organically combined sulphur content through formation of calcium sulphite and to yield solid organic material substantially insoluble in cold aqueous solutions of sulphurous acid.

3. The process of producing a lignin derivative which comprises treating waste sulphite liquor with solid phase caustic lime to precipitate a material part of the sulphur content as $CaSO_3$ substantially free from organic matter, removing said precipitate and treating the resulting liquor with solid phase caustic lime to precipitate substantially all of the lignin content, removing said precipitate and subjecting it to a steam pressure cook under conditions of caustic lime alkalinity sufficient to cause a substantial diminution of the sulphur organically combined with said lignin substance.

4. The process of producing a lignin derivative which comprises treating waste sulphite liquor with solid phase caustic lime and effecting its separation into a precipitate which is principally inorganic, a precipitate which is principally organic and a tail liquor containing carbohydrate substances, and thereupon subjecting the principally organic precipitate to a steam pressure cook under conditions of caustic lime alkalinity.

5. The process of producing a lignin derivative which comprises treating waste sulphite liquor with solid phase caustic lime and effecting its separation into a precipitate which is principally inorganic, a precipitate which is principally organic and a tail liquor containing carbohydrate substances, and thereupon subjecting the principally organic precipitate to a steam pressure cook under conditions of caustic lime alkalinity until it is converted into a solid lignin substance which is substantially insoluble in cold aqueous solutions of sulphurous acid.

6. The process of producing a lignin derivative which comprises treating waste sulphite liquor with solid phase caustic lime to obtain lignin substance in solid form substantially free from carbohydrate substances, and thereupon subjecting said matter in concentrated form to a steam pressure cook under conditions of caustic lime alkalinity.

7. The process of producing a lignin derivative which comprises treating waste sulphite liquor with solid phase caustic lime to obtain lignin substance in solid form substantially free from carbohydrate substances, and thereupon subjecting said lignin substance in concentrated form to a steam pressure cook under conditions of caustic lime alkalinity until said lignin substance is converted into a solid substance of diminished solubility in aqueous acid solutions.

8. The process of producing a lignin derivative which comprises treating waste sulphite liquor with solid phase caustic lime to obtain lignin substance in solid form substantially free from carbohydrate substances, and thereupon subjecting said lignin substance in concentrated form to a steam pressure cook under conditions of caustic lime alkalinity until said lignin substance is converted into a substance which is substantially insoluble in cold aqueous solutions of sulphurous acid.

9. The process of producing a lignin derivative which comprises treating waste sulphite liquor with solid phase caustic lime and effecting its separation into mixed inorganic and organic precipitated matter and a liquor containing carbohydrate substances, and thereupon subjecting said mixed precipitated matter in concentrated form to a steam pressure cook under conditions of caustic lime alkalinity.

10. The process of producing a lignin derivative which comprises treating waste sulphite liquor with solid phase caustic lime and effecting its separation into mixed inorganic and organic precipitated matter and a liquor containing carbohydrate substances, and thereupon subjecting said mixed precipitated matter in concentrated form to a steam pressure cook under conditions of caustic lime alkalinity until the organic matter is converted into a substance which is substantially insoluble in cold aqueous solutions of sulphurous acid.

11. The process of producing a lignin derivative which comprises treating waste sulphite liquor with solid phase caustic lime and effecting its separation into mixed inorganic and organic precipitated matter and a liquor containing carbohydrate substances, and thereupon subjecting said mixed precipitated matter in concentrated form to a steam pressure cook under conditions of caustic lime alkalinity until the organic matter is converted into a substance which is substantially insoluble in an acid which dissolves $CaSO_3$, and thereupon treating the said organic matter with such acid and thereby separating dissolved matter therefrom.

12. The process of producing a lignin derivative which comprises treating waste sulphite liquor with solid phase caustic lime to obtain a mixture of such lime, precipitated inorganic and organic material and dissolved carbohydrate substances, separating the mixed solids from the liquid and subjecting them while wet to a steam pressure cook to obtain an organic material of decreased organically combined sulphur content.

13. A solid lignin derivative obtained by subjecting lignin material substantially free from carbohydrate substances to a steam pressure cook under conditions of caustic lime alkalinity, said derivative being substantially insoluble in aqueous acid solutions, and containing substantially less than 32 parts of sulphur organically combined with 500 parts of organic matter.

14. A solid lignin derivative obtained by subjecting lignin material substantially free from carbohydrate substances to a steam pressure cook under conditions of caustic lime alkalinity, said derivative being insoluble in cold sulphurous acid solution, and containing substantially less than 32 parts of sulphur organically combined with 500 parts of organic matter.

15. A solid lignin derivative obtained by precipitation of lignin material from waste sulphite liquor by means of solid phase caustic lime, the separation of such precipitate from the resultant liquor, and the subjection of same to a steam pressure cook under conditions of caustic lime alkalinity until its organically combined sulphur content is substantially reduced.

16. A solid lignin derivative obtained by precipitation of lignin material from waste sulphite liquor by means of solid phase caustic lime, the separation of such precipitate from the resultant liquor, and the subjection of same to a steam pressure cook under conditions of caustic lime alkalinity until its organically combined sulphur content is substantially reduced and it becomes substantially insoluble in cold aqueous solutions of sulphurous acid.

In testimony whereof, I have signed my name hereto.

GUY C. HOWARD.